United States Patent [19]

Amore

[11] Patent Number: 5,653,500
[45] Date of Patent: Aug. 5, 1997

[54] BICYCLE SEAT ASSEMBLY

[76] Inventor: Anthony Amore, 4252 Bingham, Dearborn, Mich. 48126

[21] Appl. No.: 600,630

[22] Filed: Feb. 13, 1996

[51] Int. Cl.⁶ .................................. B60N 2/40; B62J 1/12
[52] U.S. Cl. .................. 297/195.13; 297/243; 280/202
[58] Field of Search .......................... 297/195.13, 243; 280/202, 284.4

[56] References Cited

U.S. PATENT DOCUMENTS

| | | | |
|---|---|---|---|
| 965,093 | 7/1910 | Fentress | 280/202 |
| 1,000,771 | 8/1911 | Bracher | 280/202 |
| 3,802,598 | 4/1974 | Burger et al. | 297/243 X |
| 4,022,488 | 5/1977 | Likas | 280/202 X |
| 4,030,648 | 6/1977 | Johnson et al. | 297/243 X |
| 4,051,985 | 10/1977 | Berger | 297/243 X |
| 4,592,592 | 6/1986 | Peck | 297/243 X |
| 5,193,830 | 3/1993 | Wang | 280/202 |
| 5,370,441 | 12/1994 | Chuang | 297/195.13 X |
| 5,383,585 | 1/1995 | Weiss | 297/195.13 X |
| 5,529,325 | 6/1996 | Glog et al. | 280/202 |

FOREIGN PATENT DOCUMENTS

| | | | |
|---|---|---|---|
| 4859 | of 1882 | United Kingdom | 280/202 |
| 19213 | of 1906 | United Kingdom | 280/202 |
| 11894 | of 1912 | United Kingdom | 280/202 |
| 188878 | 11/1922 | United Kingdom | 280/202 |
| 457219 | 11/1936 | United Kingdom | 280/202 |

*Primary Examiner*—Peter M. Cuomo
*Assistant Examiner*—Rodney B. White
*Attorney, Agent, or Firm*—Weintraub DuRoss & Brady

[57] ABSTRACT

A bicycle seat assembly to be mounted to a childrens bicycle. The assembly includes a seat which is mountable upon a bracket. The bracket, in turn, is mounted to the seat post of a bicycle, so that the seat is effectively mounted to the bicycle. Additionally, a second bracket, engageable with the first bracket and the bicycle, may be included to provide additional stability of the bicycle seat assembly.

3 Claims, 3 Drawing Sheets

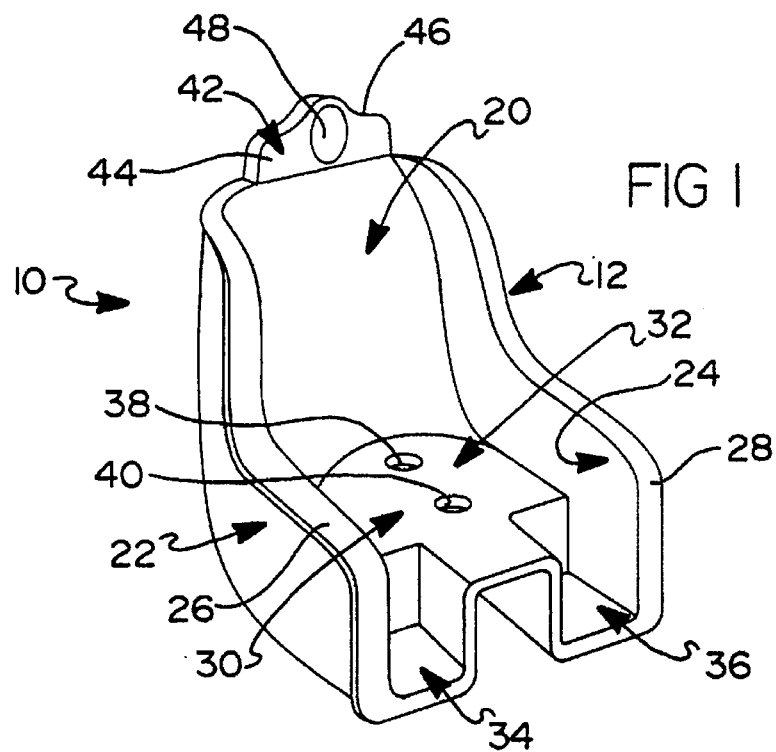
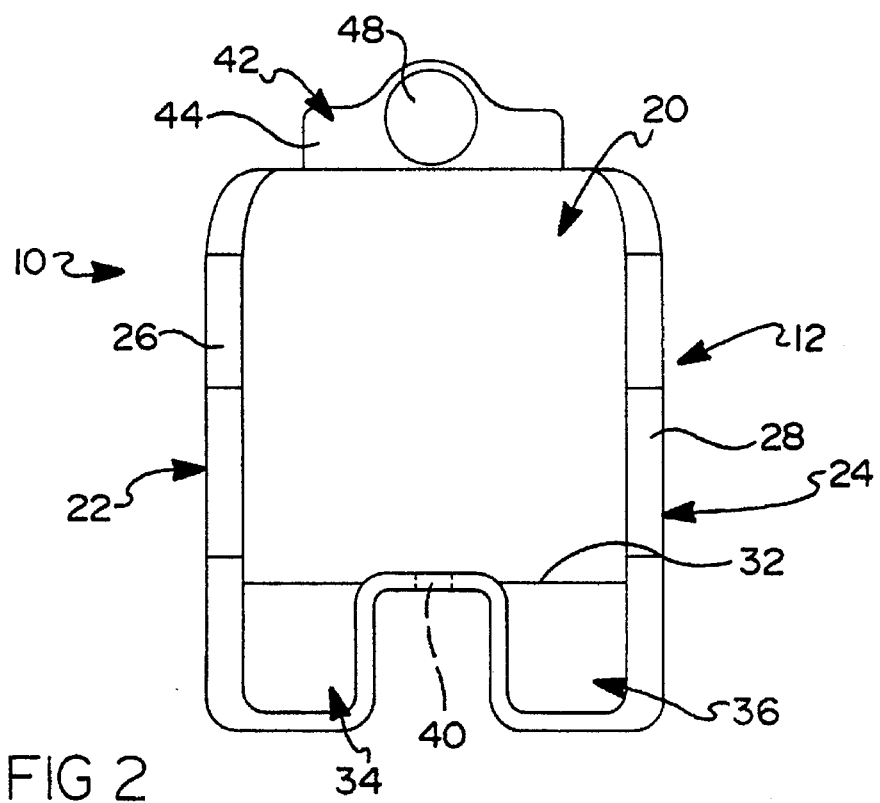

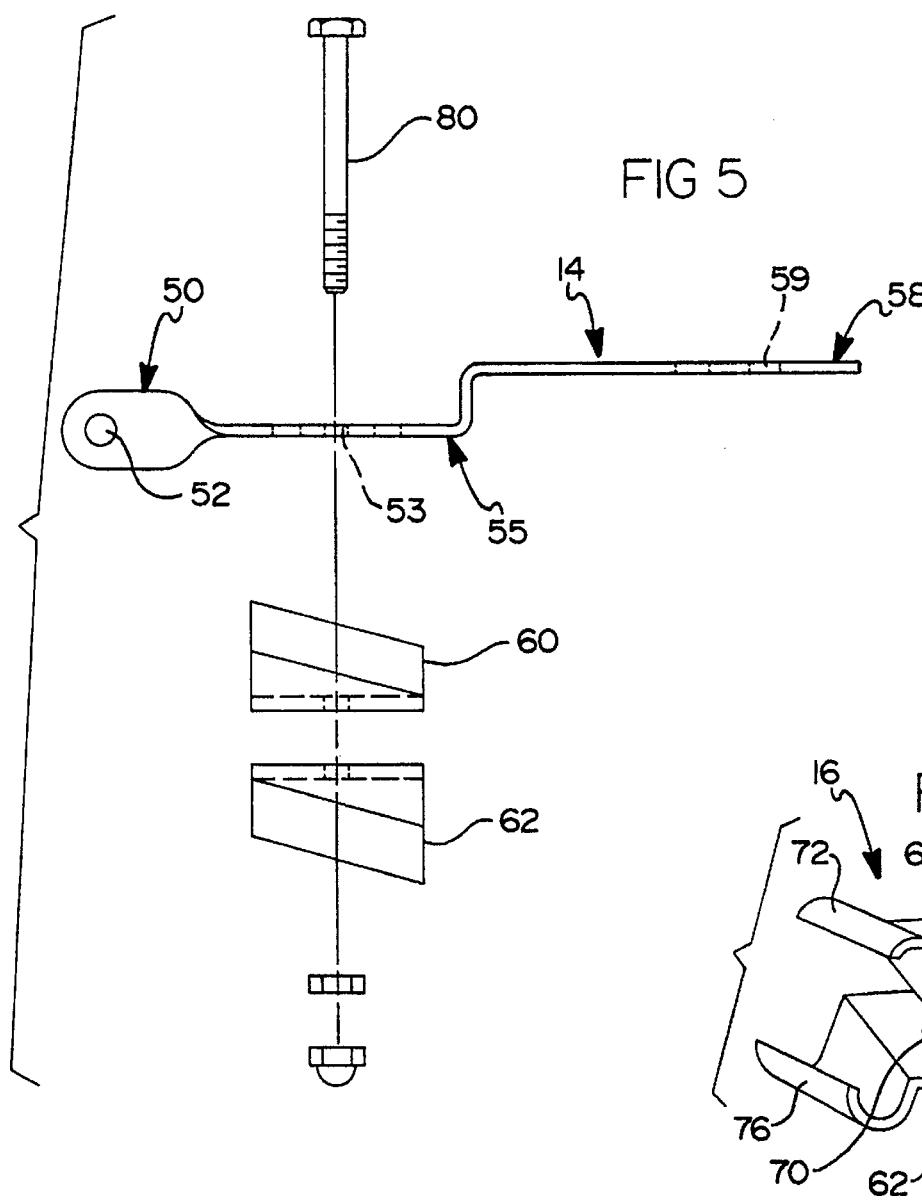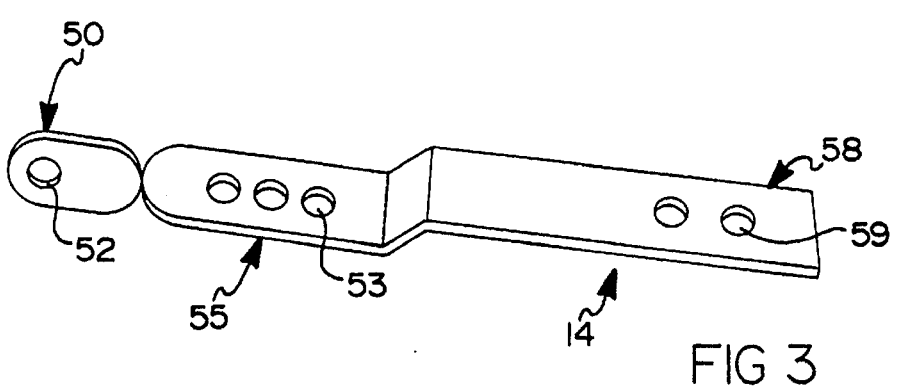

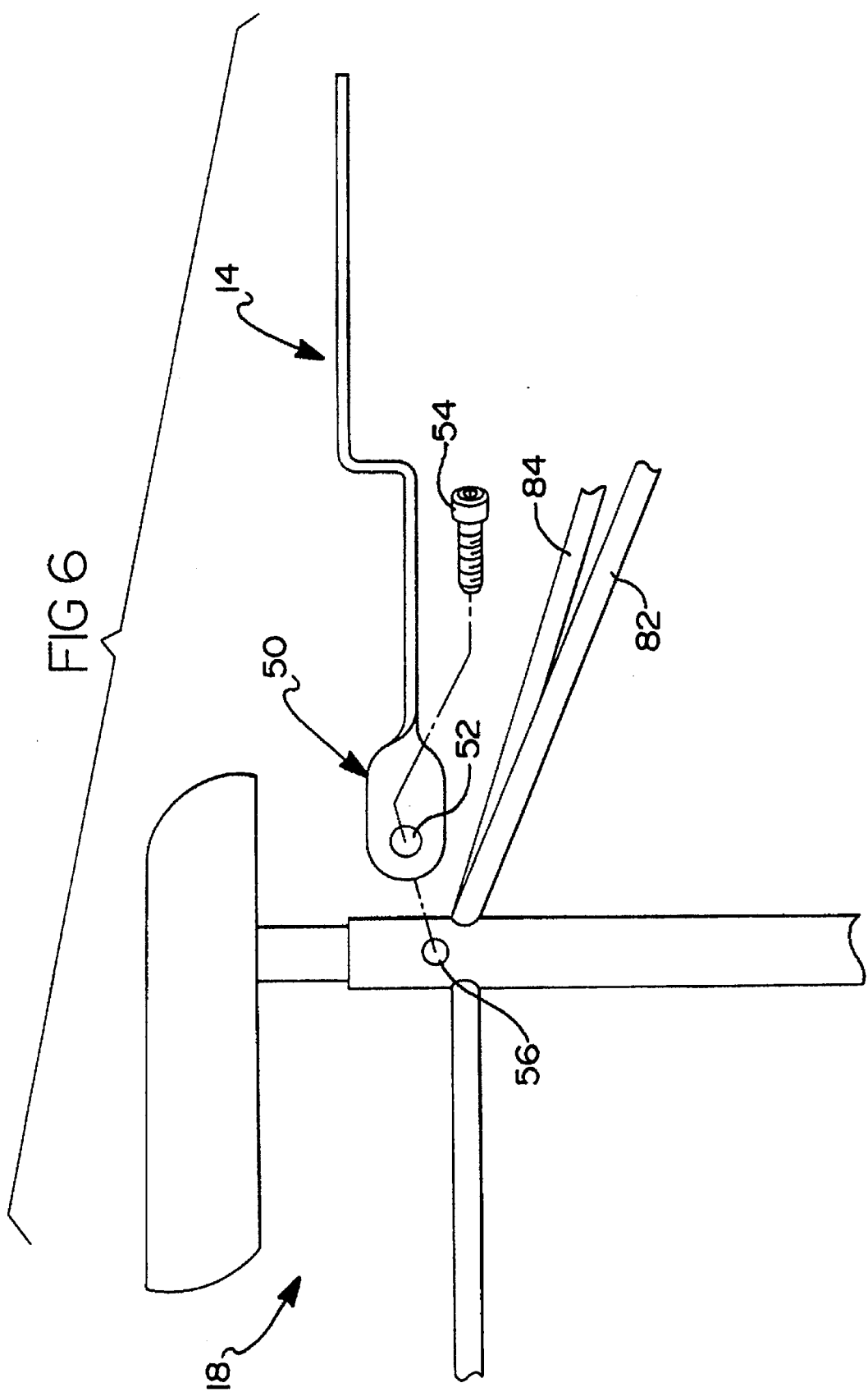

BICYCLE SEAT ASSEMBLY

BACKGROUND OF THE INVENTION

1. Field of the Invention

The present invention relates generally to bicycles. More particularly, the present invention pertains to bicycle seats. And even more particularly, the present invention relates to a bicycle seat assembly for dolls, action figures or the like.

2. Description of Prior Art

Many children enjoy riding bicycles as a means of transportation and pleasure. Additionally, many children enjoy emulating, or acting like their parents. For example, and with specific applicability to the hereinbelow disclosed invention, many children have experienced riding a bicycle with a parent wherein the child was seated in a child bicycle seat disposed behind the adult's seat. Such seats are generally disposed towards the back of a bicycle and include several strong supports for ensuring the stability and thus the safety of the child seated therein.

Because a child seat mounted to a bicycle must support the weight of the child, the seat and accompanying supports must be specially designed for such a purpose. As such, child bicycle seats are relatively expensive to produce, and are designed to be attached to an adult style bicycle as opposed to a children's bicycle.

Although child seats for bicycles are well known, it has, to the Applicant's knowledge, heretofore not been conceived of to provide a bicycle seat for action figures, dolls or other such toys. Because children enjoy emulating adults, and because children enjoy playing with action figures and dolls, the deficiency in the art precludes children from having a second seat adapted to be included at the back of a child's bicycle wherein the seat is configured to securely support a doll, action figure, or the like.

The design and configuration of a childrens bicycle is very different from adult style bicycles including ten speeds, twelve speeds and the like. Because the configurations of the bicycles are different, seats designed to mount on an adult bicycle may not be mounted to a children's bicycle.

Therefore, if a child wants to take a doll or action figure on a bicycle ride; as many children do, they must either hold the doll in one of their hands, or place the doll in a basket at the front of the bicycle. Obviously, holding a toy in one hand while riding a bicycle can prove to be extremely dangerous. As such, the art is deficient in providing a seat for use with a doll or action figure such that a child may emulate an adult by placing the doll in the seat, securing the doll therein and taking the doll for a ride.

It is to the solution of the deficiency in the art to which the present invention in directed.

SUMMARY OF THE INVENTION

The present invention provides a supplemental bicycle seat assembly for supporting a toy, the seat assembly comprising:

(a) a seat comprising:
   (i) a back wall;
   (ii) at least two side walls mounted to and extending forwardly from the back wall;
   (iii) a chair portion mounted to and disposed between the at least two side walls, and mounted to and extending forwardly from the back wall, the chair portion having at least one aperture formed therein;

(b) a first mounting bracket comprising:
   (i) a first portion defining an end of the bracket, the first portion having an aperture formed therethrough;
   (ii) a second portion defining an end of the bracket, the second portion having a plurality of apertures formed therethrough;
   (iii) a third portion aligned substantially normal to the first portion and integrally formed therewith and medial to both the first and second portions the third portion having a plurality of apertures formed therethrough; and wherein at least one of the plurality of apertures in the second portion of the bracket corresponds to and is in communication with the at least one aperture in the chair portion of the seat such that means for mounting the seat to the bracket may extend through each of the communicating apertures.

The preferred embodiment of the present invention, as implemented on a bicycle, includes a seat and two mounting brackets. A first mounting bracket removably mounts to the seat post of the bicycle and extends rearwardly therefrom. A second mounting bracket removably mounts to two rearwardly extending support bars of a bicycle.

In accordance with the present invention, the first bracket is mounted to the second bracket via a bolt, screw or the like. A seat is mounted atop the first mounting bracket. The seat is configured to secure and house a toy, action figure, or doll.

The present invention will be more clearly understood with references to the accompanying drawings. Throughout the various figures, like reference numerals refer to like parts in which:

DESCRIPTION OF THE DRAWINGS

FIG. 1 is a perspective view of a seat in accordance with the present invention;

FIG. 2 is a front plan view of a seat in accordance with the present invention;

FIG. 3 is a perspective view of a first bracket in accordance with the present invention;

FIG. 4 is a perspective view of a second bracket in accordance with the present invention;

FIG. 5 is an exploded view of a first and second bracket in accordance with the present invention; and FIG. 6 is a partial environmental view of the first bracket as mounted to a bicycle.

DETAILED DESCRIPTION OF THE PREFERRED EMBODIMENT

Referring now to FIGS. 1–3, there is depicted therein a preferred embodiment of a bicycle seat assembly in accordance with the present invention, shown generally at 10 and optimally, deployed in conjunction with a bicycle.

The bicycle seat assembly 10, generally, includes a seat 12, a first bracket 14, and a second bracket 16. The assembly 10 is configured to removably mount to a bicycle 18 via each of the first bracket 14 and the second bracket 16.

The seat is preferably formed from some durable corrosion resistant material such as plastic or the like. The seat may be formed through such well-known methods as blow molding, injection molding, cold pressing or the like.

The seat 12 includes a back wall 20. Two side walls 22, 24 are integrally formed with and extend forwardly from the back wall 20. Each side wall 22, 24 includes an arm rest 26, 28. A bottom wall 30 disposed forward of the back wall 20 cooperates with the back wall 20 and each of the two side walls 22, 24 to define a seating area 32.

The seating area 32 is further defined by a pair of foot-wells 34, 36 which are positioned adjacent a corresponding side wall 22, 24. The foot wells 34, 36 provide a space for the legs or feet of an action figure or doll to seat. This is especially useful if the doll or figure has articulated limbs, or bendable legs and arms.

The bottom wall 30 has two apertures 38, 40 formed therethrough. Although the preferred embodiment includes only two apertures 38, 40 more apertures may be included to provide additional stability to the seat assembly 10 if necessary.

As shown in FIGS. 1–2, the seat 12 additionally includes a headrest 42. The headrest 42 has a front surface 44 and a rear surface 46. The front surface 44 includes a centrally located area 48 configured to receive promotional material, such as a sticker having a name printed thereupon. As such, the bicycle seat assembly 10 of the present invention may be personalized, or include advertising depending upon the material mounted to the area 48. Such an area 48 is realized in the preferred embodiment by smoothing the area so a sticker may be applied thereto.

The seat assembly 10 in accordance with the present invention additionally includes a first bracket 14. As pictured in FIGS. 3 and 6, the first bracket has a first end or portion 50, a second end or portion 58 and a medial or third portion 55 integrally formed with and extending between the first and second portions 50, 58. The first end 50 has an aperture 52 formed therethrough and is configured to be mounted to the bicycle 18 via a seat height adjustment pin 54. The second end or portion 58 has a plurality of apertures 59 and the third potion 55 has a plurality of apertures 53.

It is well-known in the bicycle art to provide adjustment of the seat height via an aperture 56 formed in the bicycle frame. A pin 54 which may or may not be threaded, depending upon the manufacturer of the bicycle, seats in the aperture and holds the seat at a particular height.

In accordance with the present invention, the first bracket 14 is mounted to the bicycle via the pin 54. The pin 54 is passed through the aperture 52 in the first end 50 of the bracket and subsequently into the aperture 56 in the frame of the bicycle. As such, the pin 54 now functions to maintain the height of the original seat and to mount the first bracket 14 to the bicycle.

The first end 50 is aligned substantially perpendicular to both the medial or third portion 55 and the second end 58. In this fashion, when the first end 50 is mounted to a bicycle, the medial portion 55 and the second end 58 are substantially horizontally aligned.

The seat 12 is mounted to the second end 58 of the first bracket 14. Screws, bolts, rivets or the like may be used to mount the seat 12 to the first bracket 14. As a non-limiting means of example, a screw may be passed through each of one or more apertures 38, 40 in the bottom wall 30 of the seat and subsequently through one or more corresponding apertures in the second portion or end 58 of the first bracket 14. The screw or bolt may be secured via a nut or the like, so the seat 12 may be removed or adjusted if necessary.

As shown in FIGS. 4 and 5, the assembly 10 additionally includes a second bracket 16. The second bracket 16 includes a first portion 60 and a substantially similar second portion 62.

The first and second portions 60, 62 each have a pair of planar midsections 64, 66 wherein each midsection 64, 66 has an aperture 68, 70 formed therethrough. Each aperture 68, 70 may be threaded, yet, preferably, they are not to reduce production costs.

Each of the two portions 60, 62 has a pair a semi-circular shoulders 72, 74, 76, 78 extending therefrom. In use, and as shown in FIG. 5, a screw, bolt, or other means for mounting 80 seats through an aperture 53 in the third portion 55 of the first bracket. The screw 80 is then passed through each of the apertures 68, 70 in each of the pair of portions 60, 62 of the second bracket 16.

The semi-circular shoulders 72, 74, 76, 78 are configured to cooperatively surround each of the pair of rearwardly extending bars 82, 84 shown in FIG. 6. The pair of portions 60, 62 are then affixed to each of the bars 82, 84 by screwing a bolt or the like on the end of the screw 80.

In this way, the first bracket 14 is mounted to the seat post via the aperture 56 and pin 54. The first bracket 14 is additionally mounted to the second bracket 16 via the means for mounting 80 which additionally serves to mount the second bracket 16 to the bicycle.

The present invention provides a cost efficient way to mount a bicycle seat to a children's bicycle for use with an action figure or doll. As the seat is not intended to have a child seated therein, it is to be sized accordingly.

Having thus described the invention, what is claimed is:
1. A bicycle seat assembly for a toy, the seat assembly comprising:
 (a) a seat, the seat comprising:
  (i) a back wall;
  (ii) at least two side walls mounted to and extending forwardly from the back wall;
  (iii) a chair portion mounted to and disposed between the at least two side walls, and mounted to and extending forwardly from the back wall, the chair portion having at least one aperture formed therein;
 (b) a first bracket for mounting the toy seat assembly to a seat height adjustment pin of a bicycle, the bracket comprising:
  (i) a first portion defining a first end of the bracket, the first portion having an aperture formed therethrough for mounting to a bicycle seat height adjustment pin;
  (ii) a second portion defining a second end of the bracket, the second portion having a plurality of apertures formed therethrough;
  (iii) a third portion, aligned substantially normal to the first portion and integrally formed therewith and medial to both the first and second portions, the third portion having a plurality of apertures formed therethrough for mounting a second bracket thereto; and
 wherein at least one of the plurality of apertures in the second portion of the bracket corresponds to and is in communication with the at least one aperture in the chair portion of the seat such that the means for mounting the seat to the bracket may extend through each of the communicating apertures.

2. The bicycle seat assembly of claim 1 wherein the third portion is substantially parallel to the second portion.

3. The bicycle seat assembly of claim 1 wherein
 (a) a second bracket, the bracket for mounting to the rearwardly extending bars of a bicycle and comprising:
  (i) a first portion, which is engagable with a rearwardly extending bar, having at least one aperture;
  (ii) a second portion substantially similar to the first portion and in opposed relation thereto;
 (b) means for mounting the second bracket to the first bracket; and
wherein each of the at least one aperture in the first portion corresponds to and is in communication with the at least one aperture in the second portion such that the means for mounting the first bracket to the second bracket may extend through each of the communicating apertures.

* * * * *